(12) United States Patent
Kikuchi (10) Patent No.: US 8,373,787 B2
(45) Date of Patent: Feb. 12, 2013

(54) IMAGE PROCESSING APPARATUS, IMAGE PROCESSING SYSTEM, CONTROL METHOD OF THE IMAGE PROCESSING APPARATUS, AND RECORDING MEDIUM HAVING RECORDED THEREON A COMPUTER PROGRAM FOR EXECUTING THE CONTROL PROGRAM

(75) Inventor: Tomoaki Kikuchi, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/520,879

(22) PCT Filed: Feb. 19, 2008

(86) PCT No.: PCT/JP2008/053122
§ 371 (c)(1),
(2), (4) Date: Jun. 23, 2009

(87) PCT Pub. No.: WO2008/102897
PCT Pub. Date: Aug. 28, 2008

(65) Prior Publication Data
US 2010/0013950 A1    Jan. 21, 2010

(30) Foreign Application Priority Data

Feb. 21, 2007    (JP) .................................. 2007-041300

(51) Int. Cl.
*H04N 5/222*    (2006.01)
(52) U.S. Cl. .............. 348/333.02; 348/231.6; 348/240.2
(58) Field of Classification Search ............... 348/207.1, 348/231.3, 231.6, 239, 240.99, 240.2, 333.02, 348/333.03, 333.05, 561; 382/298
See application file for complete search history.

(56) References Cited

U.S. PATENT DOCUMENTS

| 5,576,759 | A  | * | 11/1996 | Kawamura et al. ...... 348/207.99 |
| 5,973,734 | A  | * | 10/1999 | Anderson ...................... 348/239 |
| 6,011,547 | A  | * | 1/2000  | Shiota et al. .................. 382/254 |
| 6,262,769 | B1 | * | 7/2001  | Anderson et al. .......... 348/333.1 |
| 6,400,852 | B1 | * | 6/2002  | Miller et al. .................. 382/298 |
| 6,567,119 | B1 | * | 5/2003  | Parulski et al. ............. 348/207.2 |

(Continued)

FOREIGN PATENT DOCUMENTS

| CN | 1501160 A | 6/2004 |
| CN | 1799252 A | 7/2006 |

(Continued)

OTHER PUBLICATIONS

The above references were cited in a Jun. 10, 2010 Chinese Office Action, which is enclosed with English Translation, that issued in Chinese Patent Application No. 200880003403.4.

(Continued)

*Primary Examiner* — Aung S Moe
*Assistant Examiner* — Chriss Yoder, III
(74) *Attorney, Agent, or Firm* — Cowan, Liebowitz & Latman, P.C.

(57) ABSTRACT

An image sensing apparatus sets a trimming area for an image file obtained by image sensing. An image processing apparatus acquires the image file to which the trimming area has been added, and displays the acquired image file on a display unit. The image processing apparatus then sets a new trimming area for the displayed image file, and distinguishably displays the trimming area set by the image sensing apparatus and the trimming area set by the image processing apparatus on the display unit.

10 Claims, 10 Drawing Sheets

U.S. PATENT DOCUMENTS

| | | | |
|---|---|---|---|
| 6,587,119 B1 * | 7/2003 | Anderson et al. | 345/672 |
| 6,894,803 B1 * | 5/2005 | Haneda | 358/1.2 |
| 6,907,194 B2 | 6/2005 | Brost | |
| 6,999,117 B2 * | 2/2006 | Yamazaki | 348/222.1 |
| 7,199,901 B2 * | 4/2007 | Watanabe et al. | 358/1.9 |
| 7,250,968 B2 * | 7/2007 | Ito | 348/240.2 |
| 7,532,753 B2 * | 5/2009 | Lipsky et al. | 382/165 |
| 7,548,339 B2 * | 6/2009 | Imai et al. | 358/1.18 |
| 7,760,388 B2 * | 7/2010 | Wada | 358/1.18 |
| 2002/0080251 A1 * | 6/2002 | Moriwaki | 348/232 |
| 2002/0097250 A1 * | 7/2002 | Fukushima et al. | 345/629 |
| 2002/0118964 A1 * | 8/2002 | Enomoto | 396/60 |
| 2003/0156197 A1 * | 8/2003 | Watanabe et al. | 348/207.2 |
| 2004/0017481 A1 * | 1/2004 | Takasumi et al. | 348/207.99 |
| 2005/0078200 A1 * | 4/2005 | Morichika | 348/231.99 |
| 2006/0114339 A1 * | 6/2006 | Ohmura et al. | 348/231.99 |

FOREIGN PATENT DOCUMENTS

| | | |
|---|---|---|
| JP | 2003-244631 | 8/2003 |
| JP | 2007-019893 | 1/2007 |
| WO | 2004/107735 A | 12/2004 |

OTHER PUBLICATIONS

The above reference was cited in a Jul. 21, 2011 European Search Report which is enclosed of the counterpart European Patent Application No. 08711886.5.

* cited by examiner

IMAGE PROCESSING APPARATUS, IMAGE PROCESSING SYSTEM, CONTROL METHOD OF THE IMAGE PROCESSING APPARATUS, AND RECORDING MEDIUM HAVING RECORDED THEREON A COMPUTER PROGRAM FOR EXECUTING THE CONTROL PROGRAM

TECHNICAL FIELD

The present invention relates to a technique for trimming/editing an image file sensed by an image sensing apparatus such as a digital camera.

BACKGROUND ART

There are digital cameras that set a trimming area for image data, cut out and save a portion of the image data, and transfer the cut out portion to a printer or another image processing apparatus for use in printing or slideshow display. In this case, image data outside of the trimming area is canceled, preventing the other image processing apparatus from being able to further set a new trimming area for the entire image data.

DISCLOSURE OF INVENTION

The present invention was made in consideration of such a background, and has as its object to enable another image processing apparatus to flexibly set a trimming area for image data sensed by an image sensing apparatus.

Further features of the present invention will become apparent from the following description of exemplary embodiments (with reference to the attached drawings).

BEST MODE FOR CARRYING OUT THE INVENTION

Figure 1:
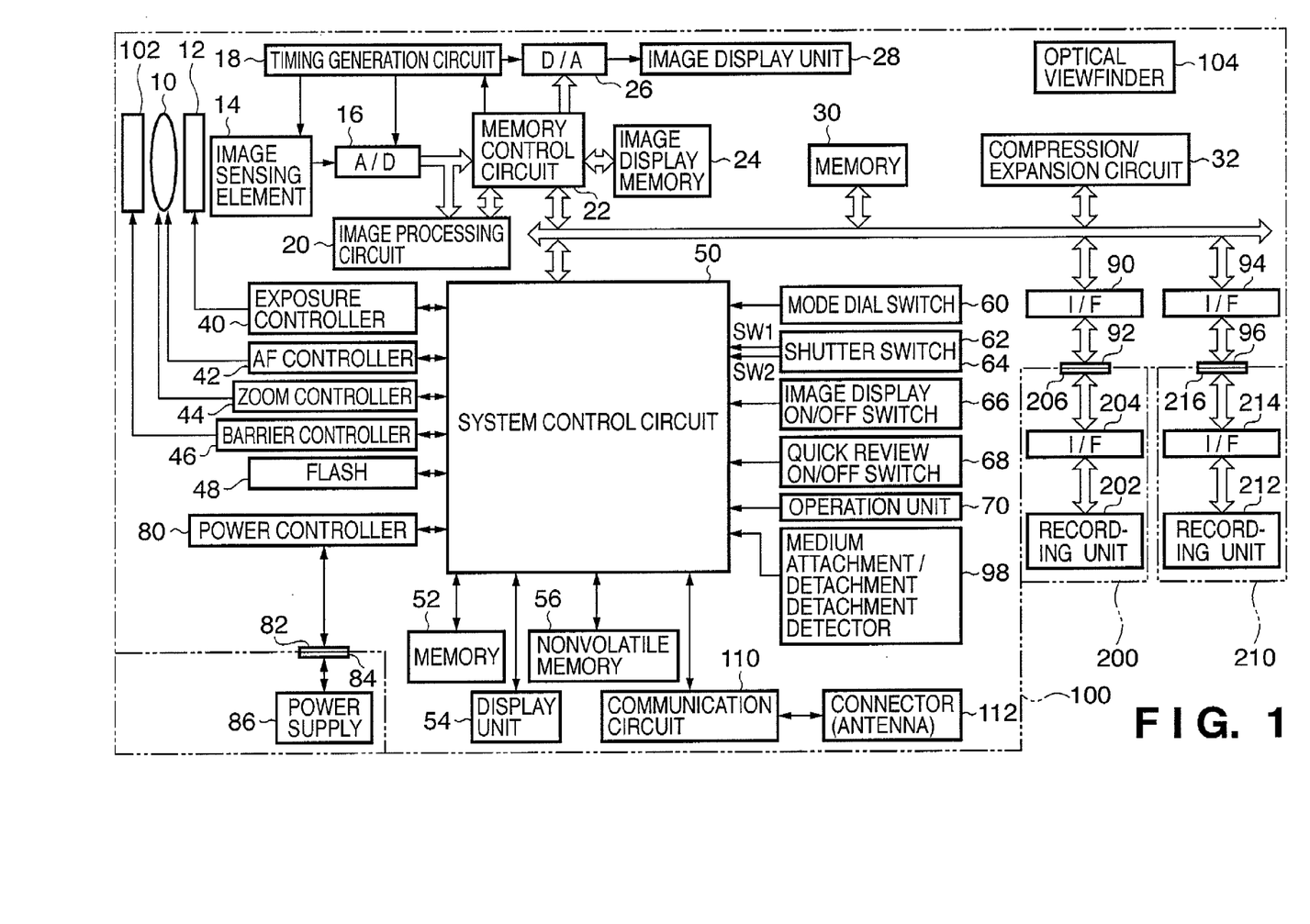
FIG. 1 is a block diagram showing the configuration of a digital camera.

Hereinafter, preferred embodiments for implementing the present invention will be described in accordance with the accompanying drawings. FIG. 1 is a block diagram showing the configuration of a digital camera that functions as one type of image processing apparatus.

The digital camera 100 photoelectrically converts an optical image of an object input via an optical system 10, and records/saves the result as image data. The optical system 10 has a plurality of lenses such as a zoom lens for altering the angle of view and a focus lens for focusing. That is, the digital camera 100 has an optical zoom function (so-called optical zoom).

Note that the digital camera 100 also has a so-called electronic zoom function for changing the angle of view by electronically cutting (trimming) a portion of the image data sensed by an image sensing element 14. The optical system 10 may also be interchangeable. In this case, a motor or the like for driving the lens group of the optical system 10 may be provided in either the interchangeable optical system 10 or the body of the digital camera 100.

An optical image of the object input from the optical system 10 is incident on the image sensing element 14 via an opening in a shutter 12 provided with an aperture function. The image sensing element 14, which is, for example, constituted by a CCD sensor or a CMOS sensor, converts the incident optical image to an analog image signal and outputs the analog image signal. An analog-to-digital (A/D) converter 16 converts the analog image signal from the image sensing element 14 to a digital signal, and outputs the digital signal as image data. The image sensing element 14 and the A/D converter 16 are controlled by a clock signal and a control signal supplied from a timing generation circuit 18. The timing generation circuit 18 is controlled by a memory control circuit 22 and a system control circuit 50.

An image processing circuit 20 performs image processing such as pixel interpolation and color conversion on the image data (digital image signal) from the A/D converter 16 or the memory control circuit 22. The image processing circuit 20 computes data for through-the-lens (TTL) auto focus (AF), auto exposure (AE), and electronic flash (EF; auto brightness control using a pre-flash), based on the image data sensed by the image sensing element 14. The image processing circuit 20 then supplies the computation result to the system control circuit 50.

The system control circuit 50 controls an exposure controller 40 and an auto focus (AF) controller 42, and realizes AE and AF functions. The image processing circuit 20 also executes TTL auto white balance (AWB) correction based on the image data sensed by the image sensing element 14.

The memory control circuit 22 controls the A/D converter 16, the timing generation circuit 18, the image processing circuit 20, an image display memory 24, a digital-to-analog (D/A) converter 26, a memory 30 and a compression/expansion circuit 32.

The image data output from the A/D converter 16 is written to the image display memory 24 or the memory 30 via both the image processing circuit 20 and the memory control circuit 22, or via only the memory control circuit 22.

The image data written to the image display memory 24 is converted by the D/A converter 26 to an analog image signal for display, and supplied to and displayed by an image display unit 28. An electronic viewfinder function is realized by image data related to image sensing being successively displayed on the image display unit 28. Display on the image display unit 28 can be arbitrarily turned on/off by a command from the system control circuit 50. This enables power consumption of the digital camera 100 to be greatly reduced.

The memory 30 is used for storing captured still images and moving images (sensed as images for recording on a recording medium). The capacity and access speed (write/read speeds) of the memory 30 can be determined arbitrarily. To enable panoramic shooting or sequential shooting whereby a plurality of still images are taken successively, it is necessary, however, to provide a memory capacity and access speed that meet these requirements. The memory 30 is also used as a work area for the system control circuit 50.

The compression/expansion circuit 32 compresses or expands image data using the adaptive discrete cosine transform (ADCT), for example. That is, the compression/expansion circuit 32 reads image data stored in the memory 30, compresses or expands the image data and writes the processed image data to the memory 30.

The exposure controller 40 controls the shutter 12 having an aperture function, based on information provided from the system control circuit 50. The exposure controller 40 also has a flash brightness control function interlocked with a flash (light emitting apparatus) 48. The flash 48 has a flash brightness control function and an AF assist light function.

The AF controller 42 controls the focus lens of the optical system 10, based on information provided from the system control circuit 50. A zoom controller 44 controls the zooming of the optical system 10. The barrier controller 46 controls the operations of a barrier 102 that protects the optical system 10.

Memory 52 stores the constants, variables, and programs for operation of the system controller 50.

A display unit (e.g., LCD, LED) 54 is constituted to output operating states, messages or the like using characters, images and sound, in response to the execution of programs in the system control circuit 50. The display unit 54 is disposed in appropriate places in the digital camera 100. A display element constituting part of the display unit 54 is disposed in an optical viewfinder 104.

The display content of the display unit 54 displayed on a liquid crystal display (LCD) or the like includes, for example, single shot/sequential shooting, self-timer, compression ratio, number of recording pixels, number of recorded images, remaining number of recordable images, shutter speed, aperture value, exposure compensation, flash, red-eye reduction, macro, buzzer setting, clock battery power, camera battery power, error, multi-digit display, medium (i.e., recording media 200 and 210) attachment/detachment, communication I/F operation, and date/time.

The display content of the display unit 54 displayed within the optical viewfinder 104 includes, for example, focusing, camera-shake warning, flash charging, shutter speed, aperture value, and exposure compensation.

A nonvolatile memory 56 is an electrically erasable/recordable memory such as an EEPROM, for example. Object data from image data or an external device may be stored in the nonvolatile memory 56. A setting parameter area for connecting to a network is provided separately in the nonvolatile memory 56.

Numerals 60, 62, 64, 66, 68 and 70 denote operation means for inputting various operation instructions to the system control circuit 50, comprising a single or plurality of combinations of switches, dials, touch panels, a device for pointing by line-of-sight detection, a voice recognition device, and the like.

Specifically, numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

A first shutter switch (SW1:62) is turned on by operating the shutter button partway (half press). When the first shutter switch (SW1) is on, the system control circuit 50 starts AF, AE and AWB processing.

A second shutter switch (SW2:64) is turned on by operating the shutter button fully (full press). When the second shutter switch (SW2) is on, a series of image sensing processes is executed. This series of image sensing processes includes reading an image signal from the image sensing element 14, A/D conversion by the A/D converter 16, image processing by the image processing circuit 20, and writing to the memory 30. The system control circuit 50 is also instructed to start a series of processes (image sensing processes) that involves image data being read from the memory 30 and compressed by the compression/expansion circuit 32, and the compressed image data being written to the recording medium 200 or 210.

An image display ON/OFF switch 66 can set ON/OFF of the image display unit 28. With this function, in image sensing using the optical viewfinder 104, power supply to the image display unit 28 comprising an LCD or the like can be cut to save the power.

A quick review ON/OFF switch 68 sets the quick review function of automatically reproducing sensed image data immediately after image sensing. In this embodiment, especially, the switch 68 has a function of setting the quick review function in the OFF state of the image display unit 28.

An operation unit 70 is used when, inter alia, turning power on/off, setting or modifying shooting conditions, checking shooting conditions, checking the state of the digital camera 100, and checking captured images.

A power controller 80 includes, for example, a power detection circuit, a DC-DC converter, and a switch circuit for switching the blocks to be energized. The power controller 80 also detects the presence or absence of a power supply, the type of power supply and the remaining the remaining battery power level, controls the DC-DC converter in accordance with the detection result and commands from the system control circuit 50, and supplies a required voltage to each block for a required period. The body of the digital camera 100 and a power supply 86 respectively include connectors 82 and 84, and are connected thereby. The power supply 86 is, for example, a primary battery such as an alkaline battery or a lithium battery, a secondary battery such as a NiCd battery, a NiMH battery or a Li battery, or an AC adapter.

The recording media 200 and 210 are respectively connected to connectors 92 and 96 on the body of the digital camera 100 via connectors 206 and 216. The recording media 200 and 210 respectively include recording units 202 and 212 such as a semiconductor memory or a hard disk, for example, and interfaces 204 and 214, and are connected to a bus in the digital camera 100 via interfaces 90 and 94 on the body of the digital camera 100. A medium attachment/detachment detector 98 detects whether the recording medium 200 or 210 is connected to the connectors 92 and 96.

Note that this example is described in terms of there being two systems of interfaces and connectors for attaching recording media, although there may be one system or three or more systems. In the case where plural systems of interfaces and connectors are provided, the systems may have mutually different specifications. Interfaces and connectors that comply with PCMCIA card standards, Compact Flash (CF, registered trademark) card standards or the like may be employed.

Interfaces and connectors that comply with PCMCIA card standards, Compact Flash (CF, registered trademark) card standards or the like can be employed as the interfaces 90 and 94 and connectors 92 and 96. In this case, a variety of communication cards can be connected, such as LAN cards, modem cards, USB cards, IEEE1394 cards, P1284 cards, SCSI cards, and PHS and other communication cards. Image data and management information attached to the image data can then be mutually transferred to and from another computer and a peripheral device such as a printer.

The optical viewfinder 104 enables images to be captured without using the electronic viewfinder function of the image display unit 28. A display element constituting part of the display unit 54 can be disposed in the optical viewfinder 104, an example of which includes a display element for displaying content such as focusing, camera-shake warning, flash charging, shutter speed, aperture value, and exposure compensation.

The digital camera 100 has a communication circuit 110, and provides a variety of communication functions including USB, IEEE1394, P1284, SCSI, modem, LAN, RS232C and wireless communication. A connector 112 for connecting the digital camera 100 to another device or an antenna when a wireless communication function is provided can be connected to the communication circuit 110.

The present embodiment is described in terms of this communication circuit 110 being provided with both a wireless LAN (IEEE802.11x) interface and a USB interface. The communication circuit 110 is also assumed to be separately provided with an interface for performing wireless communication using weak radio wave. This wireless communication can take any form, whether wireless LAN or infrared communication, and the connection settings are assumed to be prerecorded in a wireless settings area of the nonvolatile memory 56.

Figure 2:
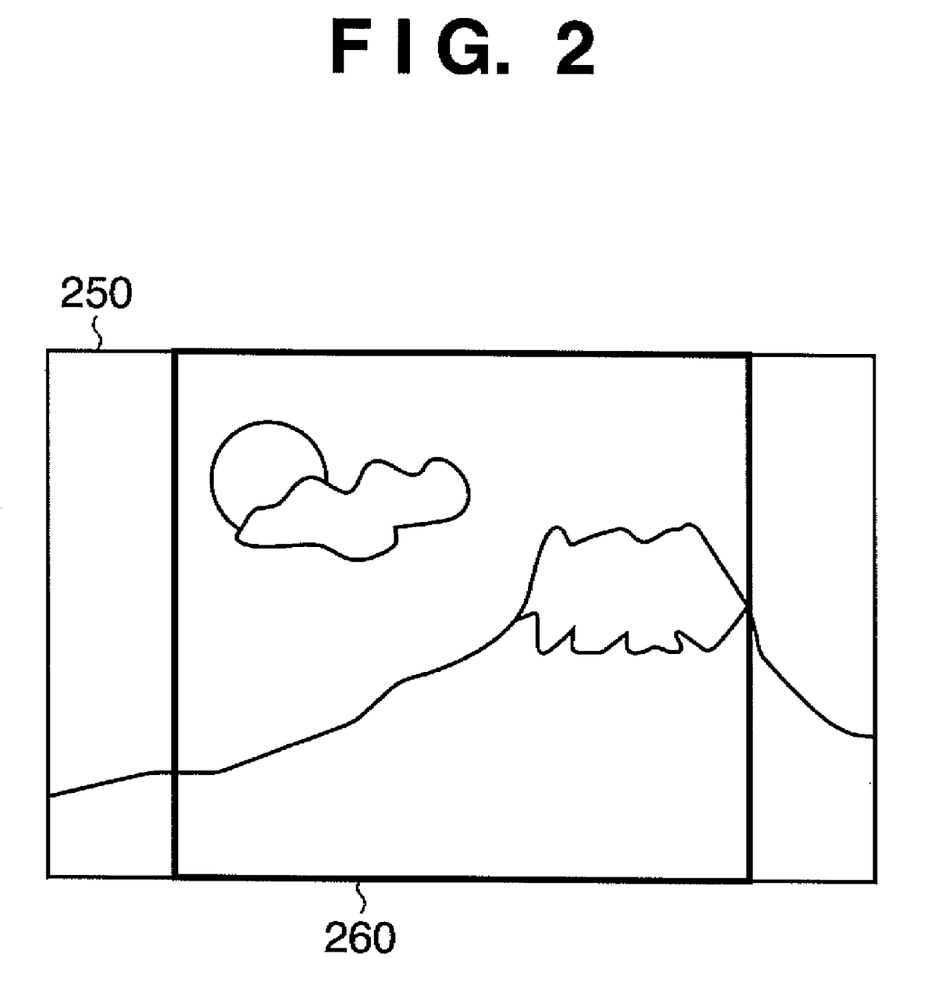
FIG. 2 illustrates a process of setting trimming information (trimming frame) in the digital camera.
Figure 3:
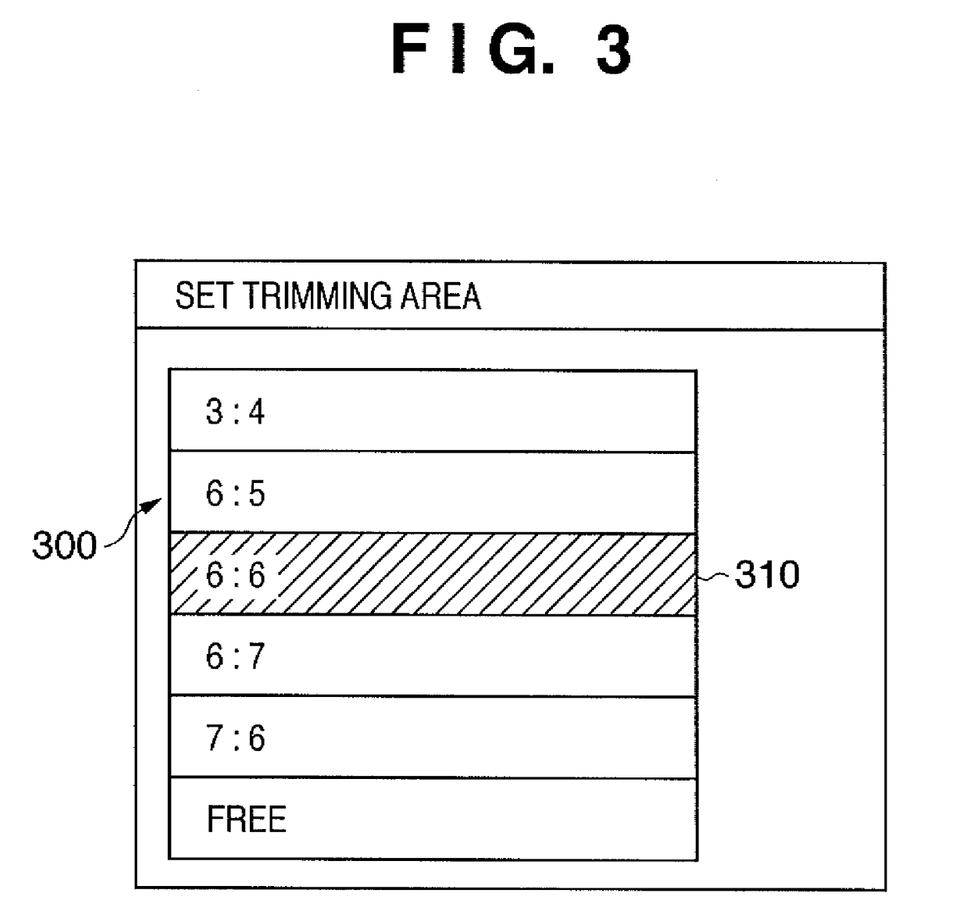
FIG. 3 shows a menu of aspect ratios for a trimming frame set in the digital camera.

The digital camera 100 is able to set trimming information showing which area of image data sensed by the image sensing element 14 to cut out and use. This trimming information, in the present embodiment, is set interactively as a rectangular trimming frame. As shown in FIG. 2, for example, the ratio of the length and breadth (aspect ratio) of captured image data 250 is assumed to be 2:3. A menu 300 of prescribed aspect ratios is displayed on the image display unit 28, as shown in FIG. 3, in relation to this 2:3 aspect ratio, and an aspect ratio 310 selected from this menu is set as the trimming area. In FIG. 3, "6:6", or in other words, a square aspect ratio, has been selected. In this case, in the present embodiment, a central region 260 of the captured image data 250 enclosed by a square whose sides have a length corresponding to the number of vertical pixels (short side) is set as the trimming area, as shown in FIG. 2.

Trimming information showing the trimming area thus set is embedded in the image file as attribute information of the image data. Specifically, the trimming information is written into an area referred to as a "Maker Note" of an Exif image file.

Figure 4:
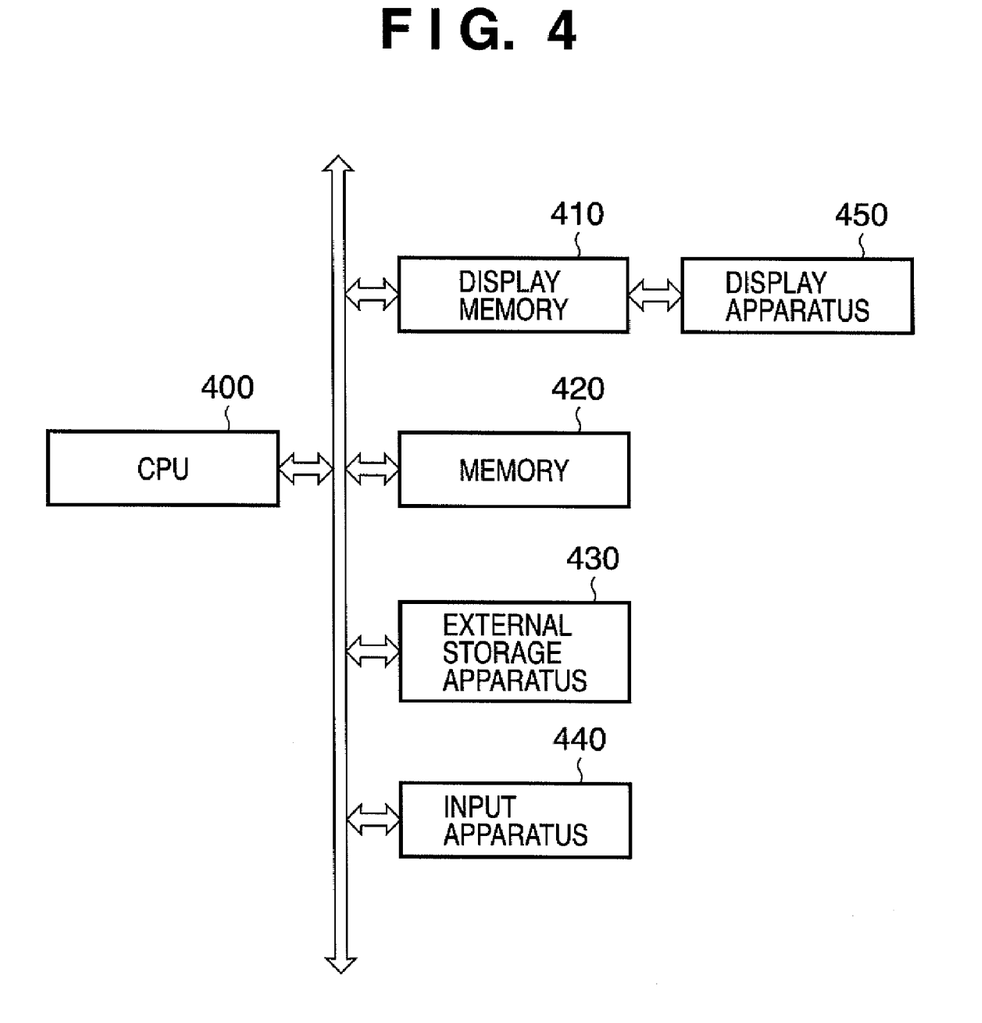
FIG. 4 is a block diagram showing the configuration of an image processing apparatus.

The image file sensed and recorded by the digital camera 100 can be edited by an image processing apparatus such as that shown in FIG. 4. The image processing apparatus of FIG. 4 is constituted by a personal computer, and has a CPU 400, a display memory 410, a display apparatus 450, a memory 420, an external storage apparatus 430, and an input apparatus 440. The memory 420 is constituted by a ROM, RAM and the like. A boot program is preset in the ROM. The RAM is utilized as a work area for decompressing various programs executed by the CPU 400, for instance. The display apparatus 450 is constituted by a CRT, LCD or the like. The input apparatus 440 is constituted by a keyboard, mouse or the like.

The external storage apparatus 430 stores an operating system (OS), an image editing application program, image files, and the like. The image files stored in the external storage apparatus 430 can be developed in the display memory 410 based on the image editing application program, and displayed by the display apparatus 450. At this time, if a trimming area has been set by the digital camera 100 for the image data, a trimming frame showing this trimming area is superimposed on the image data.

The image editing application program contains a function of selecting arbitrary image data and editing the selected image data by adding, modifying or deleting trimming information. The editing can be performed using a graphical user interface (GUI) included in the image editing application program. Note that image data (file) to be edited can be saved with the same filename or a different filename.

Figure 5:
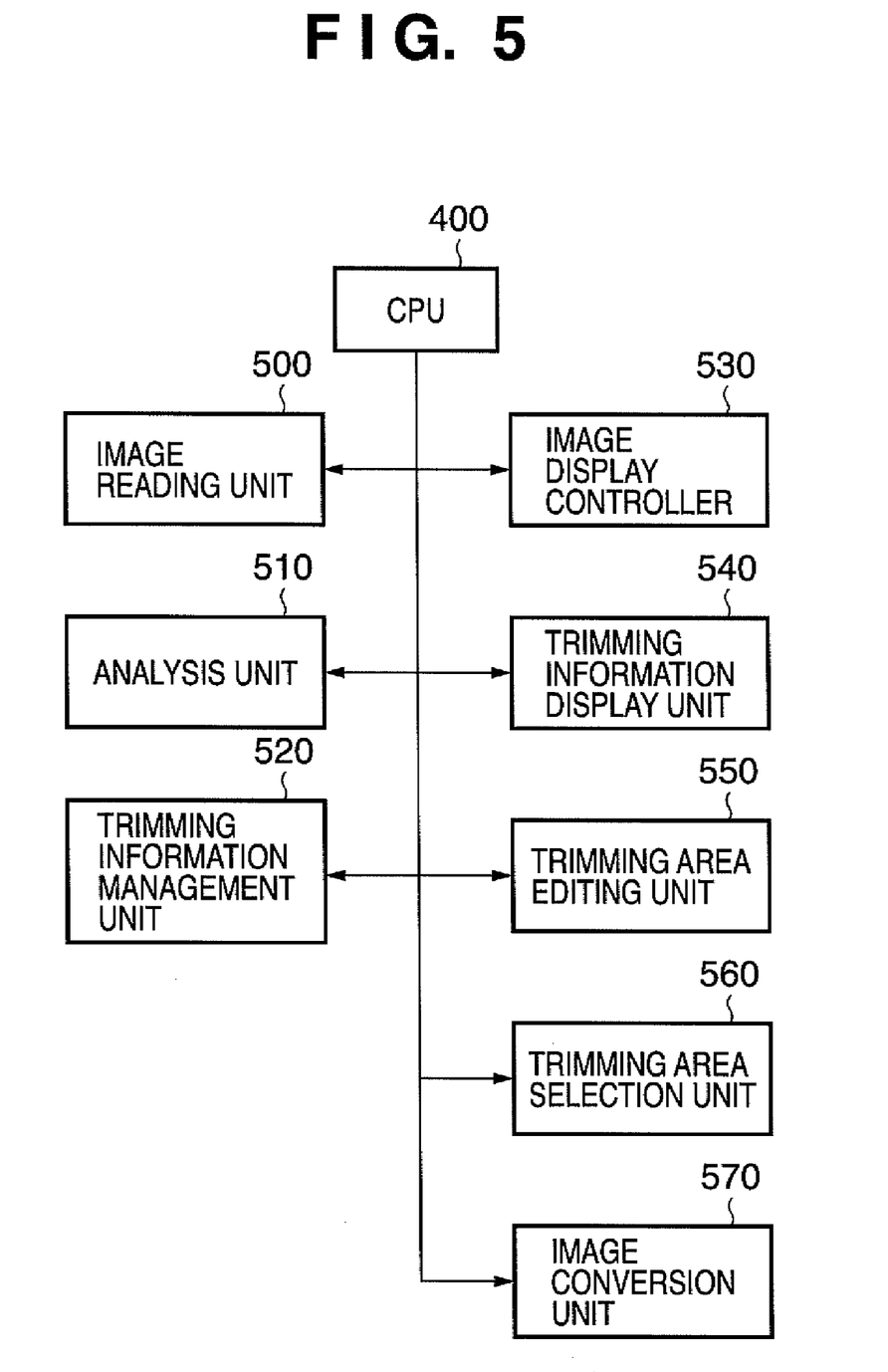
FIG. 5 is a functional block diagram showing the functions of an image editing application program loaded in the image processing apparatus.

FIG. 5 is a functional block diagram showing the functions of the image editing application program. An image reading unit 500 performs a reading process of reading an image file stored in the external storage apparatus 430. An analysis unit 510 analyzes the image file read by the image reading unit 500, and acquires image data, trimming information and the like.

A trimming information management unit 520 individually manages this trimming information. An image display controller 530 performs a display control for displaying a list of the image files stored in the external storage apparatus 430. A trimming information display unit 540 displays image data having a trimming information with the trimming frame thereof superimposed on the image data.

A trimming area editing unit 550 newly sets or modifies the trimming area of a selected image. A trimming area selection unit 560 selects a trimming area that is applied to the selected image when the result of editing the selected image is shown An image conversion unit 570 performs processing such as cutting out image data based on the trimming frame of the image data.

Next, the process of displaying a list of image files in the image processing apparatus will be described based on the flowchart of FIG. 6.

The CPU 400 reads one of the image files (image data) stored in the external storage apparatus 430 (step S600). Next, the CPU 400 analyzes the read image file, and acquires trimming information set by the digital camera 100 (steps S601, S602).

Next, the CPU 400 creates reduced image data for list display, and displays the reduced image data on a list screen (step S603). The CPU 400 also generates trimming frame data based on the trimming information acquired in step S602, and superimposes the trimming frame (area) on the reduced image data (step S604).

Next, the CPU 400 determines whether any image files not shown on the list screen exist in the external storage apparatus 430 (step S605). If there are one or more image files not yet shown on the list screen, the CPU 400 returns to step S600.

Figure 6:
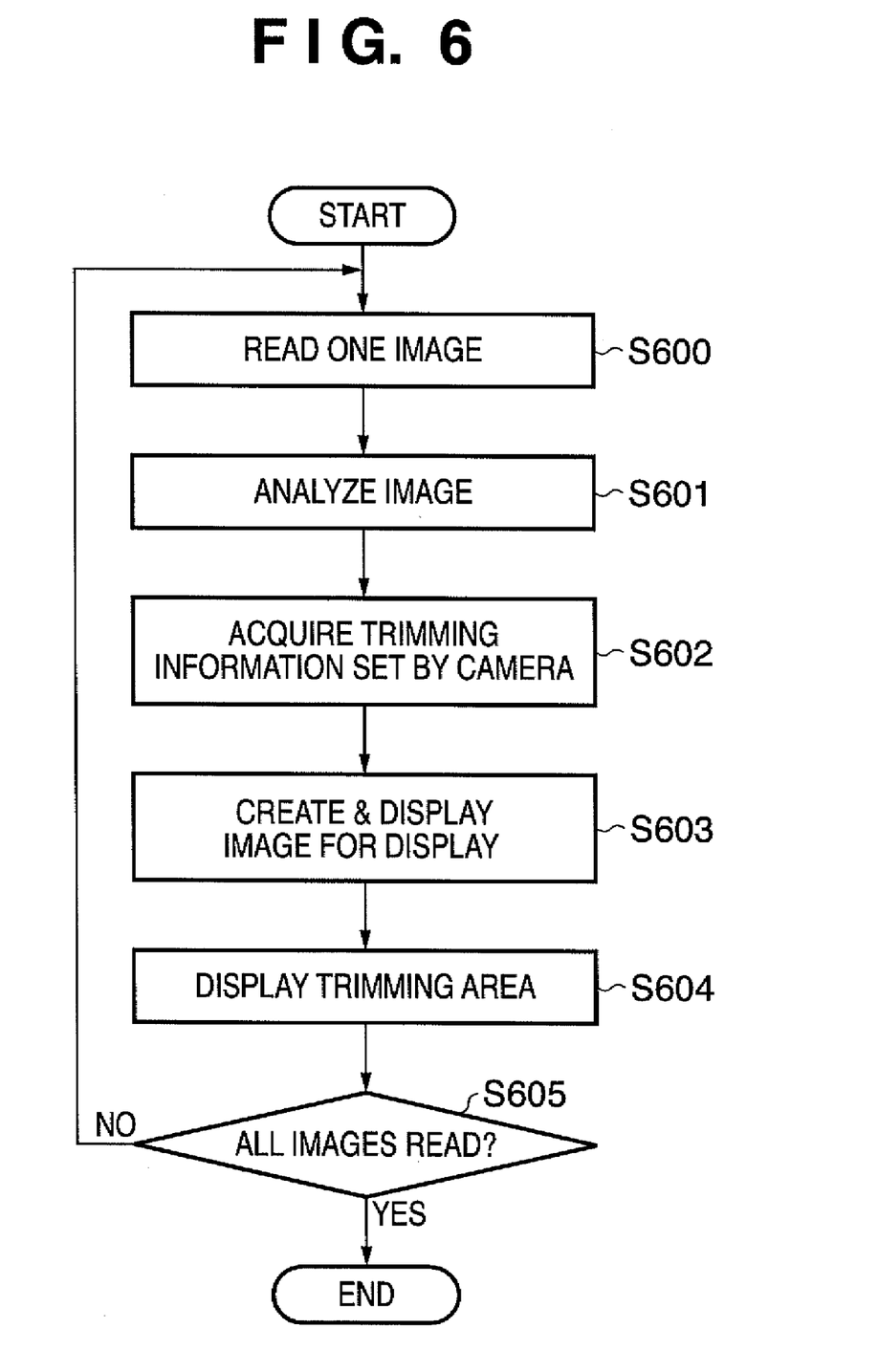
FIG. 6 is a flowchart showing a process of displaying a list of images in the image processing apparatus.
Figure 7:
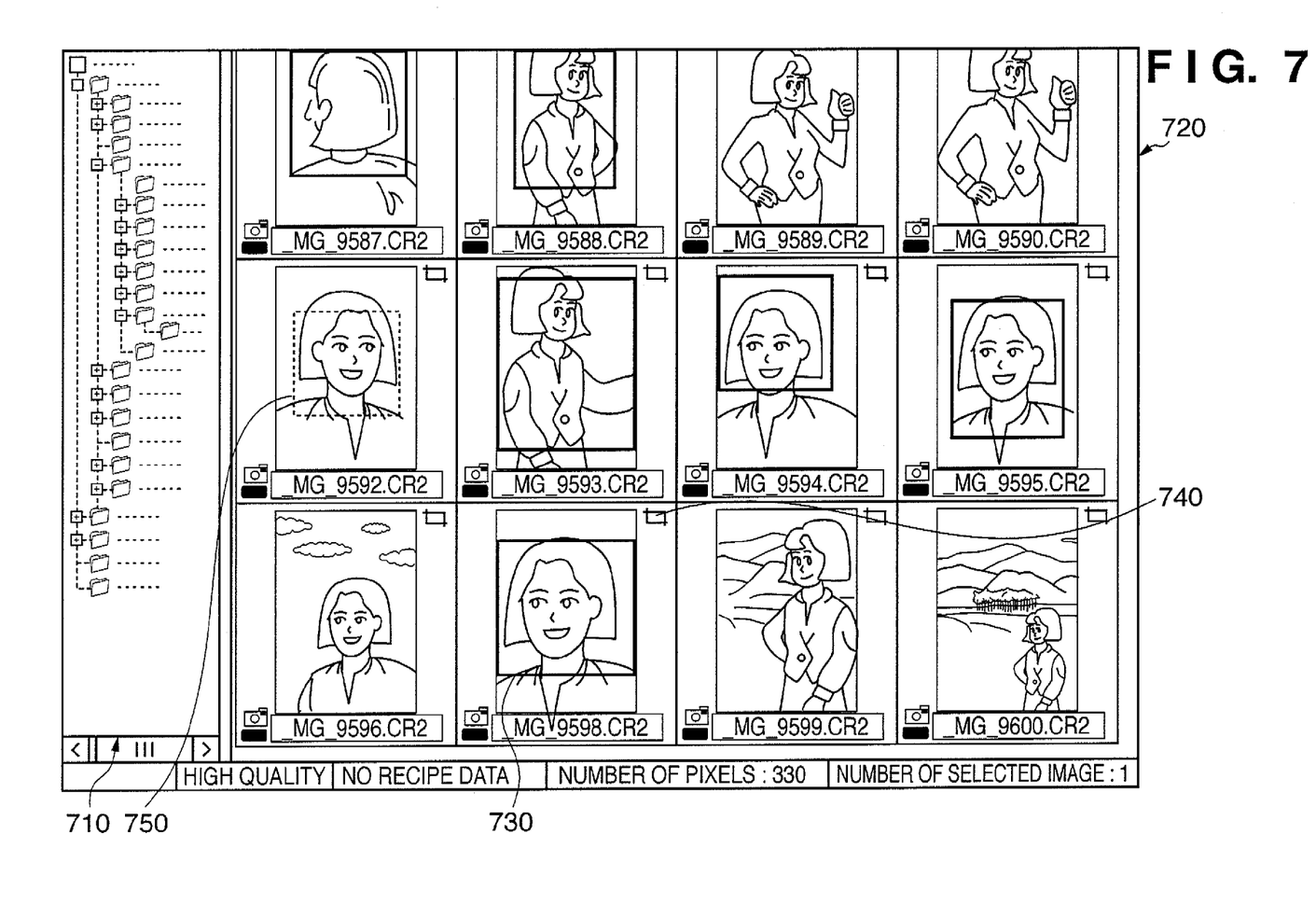
FIG. 7 shows an exemplary image list display screen.

FIG. 7 shows a specific example of the list display process of FIG. 6. As shown in FIG. 7, a tree showing a hierarchy of folders (directories) constructed on the external storage apparatus 430 is displayed on a folder tree window 710. The user is able to select a file storing desired image data by selecting a folder on this tree.

That is, if a folder related to an image file is selected, the group of image files in the folder is read and a list of thumbnail (reduced) images is displayed on a thumbnail display window 720. In this case, when trimming information has been set by the digital camera 100 for this image data, a trimming frame 730 related to this trimming information is superimposed on the reduced image data. A trimming information mark 740 showing that trimming information has been set by the digital camera 100 is displayed in proximity to the reduced image data.

In the present embodiment, trimming information can be newly set by the image processing apparatus for image data. Also, trimming information set by the digital camera 100 can be modified or deleted by the image processing apparatus.

Note that a trimming frame related to trimming information set or modified by the image processing apparatus (see reference numeral 750 in FIG. 7) is displayed in a different form to the trimming frame 730 related to trimming information set by the digital camera 100. For example, the trimming frame 730 is displayed in black, and the trimming frame 750 is displayed in red.

Figure 8:
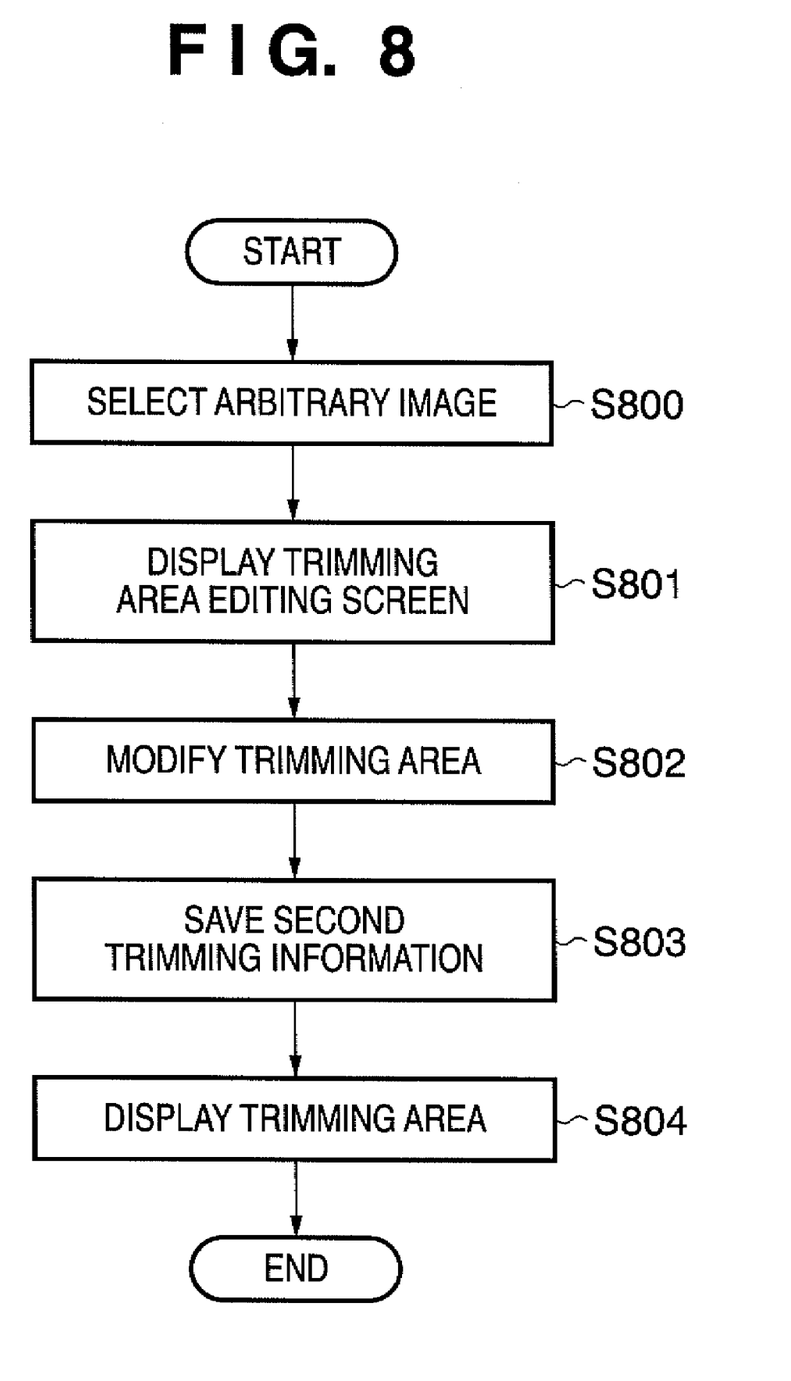
FIG. 8 is a flowchart showing a process of setting (modifying) trimming information.

Next, the process of setting trimming information by the image processing apparatus will be described with reference to the flowchart of FIG. 8. The user selects an arbitrary image from the image data displayed as a list (step S800). Here, plural pieces of image data may be selected. The CPU 400 displays the first piece of selected image data on a trimming area editing screen (step S801). This trimming area editing screen is constituted by a GUI. The user therefore sets a trimming area on the trimming area editing screen (step S802). This process of setting a trimming area includes newly adding, rewriting and deleting trimming information.

Next, the CPU 400 saves second trimming information showing the trimming area related to the setting by the image processing apparatus (step S803). The second trimming information is saved in the work memory which stores data temporarily while the image editing application program is executed. The second trimming information held in this work memory is actually recorded to an image file when an image file is saved or printed. The second trimming information may, however, be recorded to an image file at the point at which the second trimming information is set and the content is finalized in step S802.

The recording area for the second trimming information in the image file is called the application data area. The application data area stores data added to image data by the processing of an application program on the image processing apparatus, and records not only trimming information but also operations performed on the image processing apparatus.

Next, the CPU 400 returns to the list display screen and displays the trimming frame 750 related to the setting (modification) (step S804).

Figure 9:
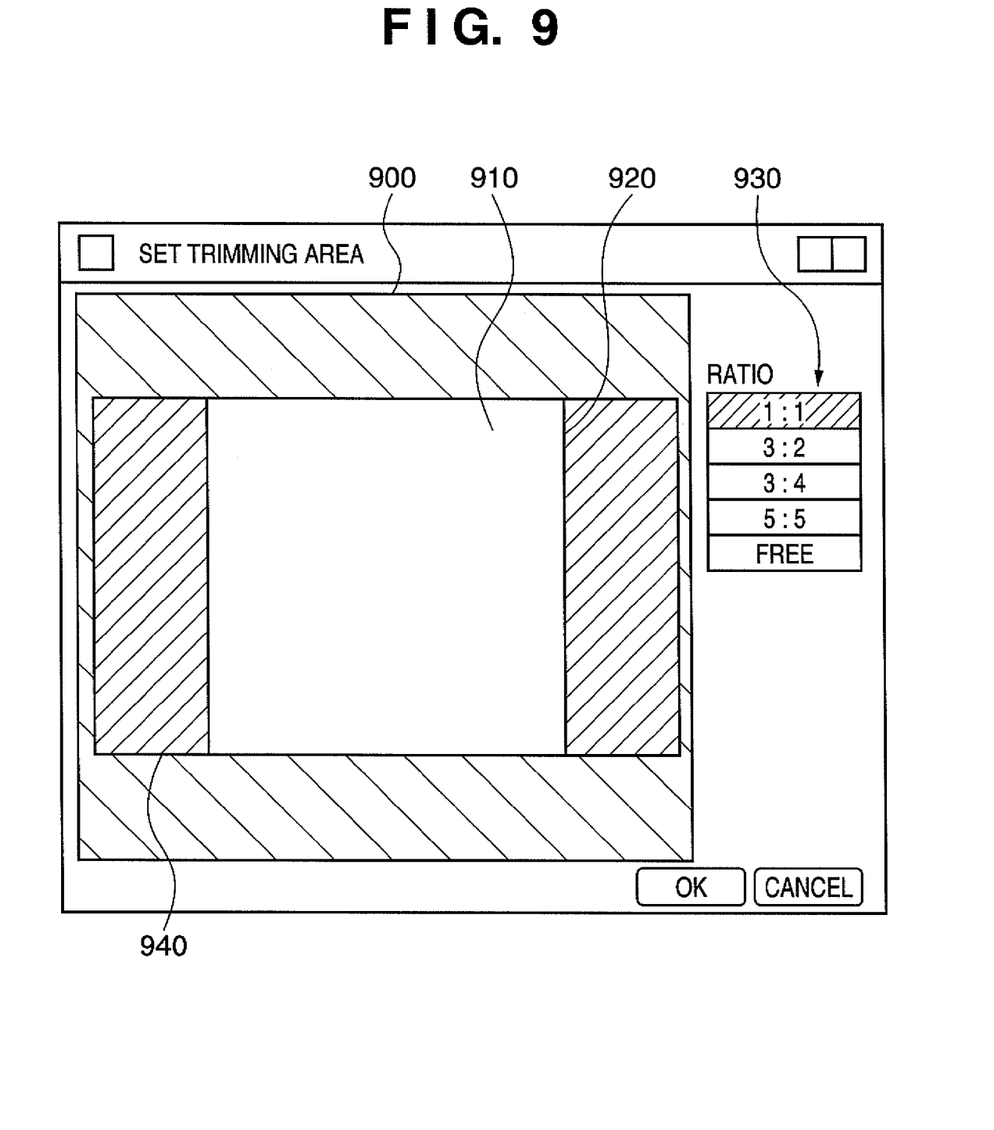
FIG. 9 shows an exemplary trimming area editing screen.

FIG. 9 shows an exemplary configuration of the foregoing trimming area editing screen. The trimming area editing screen is displayed on the display apparatus 450 of the image processing apparatus as a GUI such as that shown in FIG. 9. On the trimming area editing screen of FIG. 9, image data 940 sensed by the image sensing element 14 of the digital camera 100 is displayed in an image data display area 900. In this case, if first trimming information has been set by the digital camera 100, a trimming frame 920 related to this first trimming information is displayed from the beginning. A list 930 of aspect ratios which can be set (modifying) by the image processing apparatus is displayed to the right of the image data display area 900.

The user therefore selects the desired aspect ratio from the displayed list 930 of aspect ratios. In this case, the user is also able to select "Free" from the list 930, and input and set an arbitrary aspect ratio.

Once the desired aspect ratio has been selected, the trimming frame 920 showing a trimming area 910 related to this aspect ratio is displayed together with the image data. In the case where the trimming frame 920 is as intended, the user presses the OK button. Display thus switches from the trimming area editing screen of FIG. 9 to the thumbnail list display screen of FIG. 7.

Here, the attribute information related to the trimming of image data sensed by the digital camera 100 includes the first trimming information set by the digital camera 100 and the second trimming information set by image processing apparatus.

In the present embodiment, a trimming frame related to first trimming information and a trimming frame related to second trimming information are, as aforementioned, shown with mutually different colors. Also, in the case where first trimming information has been set by the digital camera 100, a mark indicating this is displayed when thumbnails of image data are displayed as a list in the image processing apparatus.

Note that in the case where both first trimming information and second trimming information are set for the same image data, either one may be selectively displayed, or both may be displayed at the same time. At this time, the screen displaying the first trimming information and the screen displaying the second trimming information may be constituted either by switching the same screen or by separate screens. For example, a high resolution image of an image file on which a trimming frame based on first trimming information is superimposed can be displayed on a detailed display screen, and a low resolution image of the image file on which a trimming frame based on second trimming information is superimposed can be displayed on a thumbnail list screen.

The line of a trimming frame related to first trimming information and the line of a trimming frame related to second trimming information can also be displayed with mutually different types of lines.

In the case where either the first or second trimming information is selectively displayed, the selection may be determined in accordance with a user operation.

Alternatively, the selection may be automatically determined in accordance with the operation mode being executed in the image processing apparatus. For example, first trimming information may be selected if it is detected that a print setting mode is currently being executed in the image processing apparatus, and second trimming information may be selected if it is detected that a slideshow setting mode is currently being executed.

Also, one of first and second trimming information may be selected in advance, image files for which the selected trimming information is set may be retrieved, and trimming frames may be superimposed on the retrieved image files. It is conceivable, for example, to retrieve image files for which first trimming information is set from the external storage apparatus 430 of the image processing apparatus, display thumbnail images of these image files as a list, and superimpose trimming frames based on the first trimming information on the respective thumbnail images.

Figure 10:
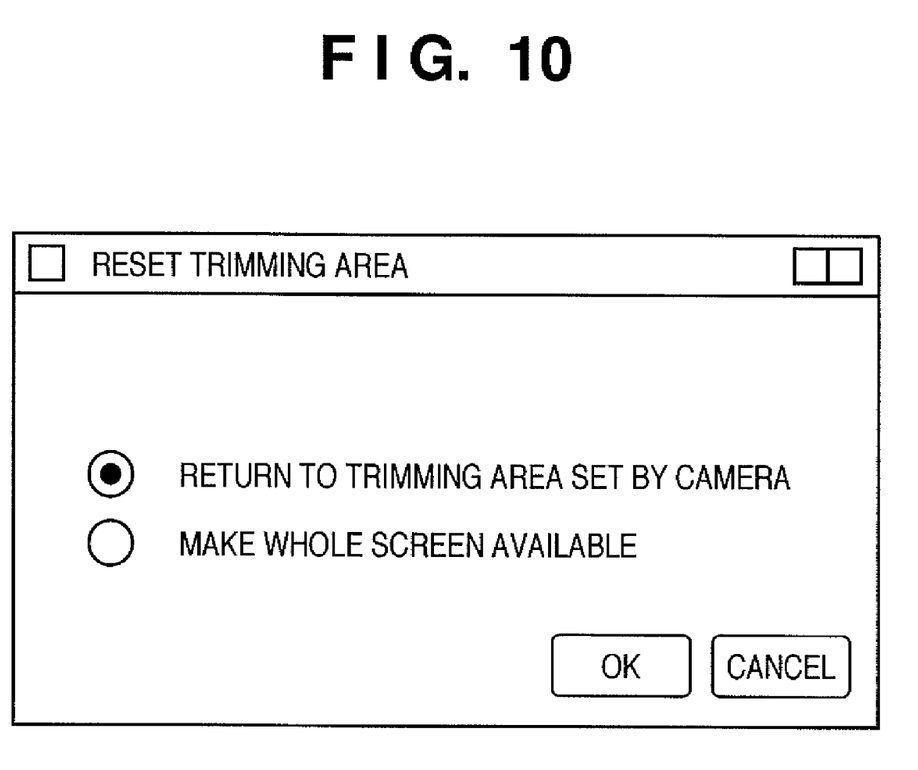
FIG. 10 shows an exemplary trimming area reset screen.

Further, when saving or printing an image file, a reset process can also be performed to return to the state of the trimming area set by the digital camera 100 or to cancel the trimming area settings, as shown in FIG. 10. Note that the option "Make whole screen available" shown in FIG. 10 indicates that both first and second trimming information settings will be canceled, and the entire area of the sensed image data will be made available.

In cases such as where an image is printed after being edited or an image is changed to a different format such as from TIFF to JPEG, for example, various processing is performed on the image data in the trimming area. Here as well, if there is first and second trimming information, the user may be allowed to select one of the two or operations may be performed using the second trimming information as a default operation. For example, it is conceivable to preset default trimming information corresponding to the image output method. Specifically, it is conceivable to use first trimming information in the case where an image is output to a printer or to a photo album template, and to use second trimming information in the case where the image is to be played back in a slideshow.

Note that the present invention is not limited to the foregoing embodiments. For example, it is possible to move and set a trimming frame related to an aspect ratio that has been selected. In this case, it is conceivable to move the trimming frame as a result of the user performing a drag and drop operation using a pointing device. It is also conceivable to draw a rectangular frame from an arbitrary start point to create a trimming frame as a result of the user performing a drag and drop operation using a pointing device. The trimming frame may also be an area enclosed by a curved line, rather than being rectangular.

Further, a configuration is possible in which second trimming information set by an image processing apparatus and added to an image file can only read by an image processing apparatus installed with a specific image editing application, whereas first trimming information set by a digital camera can be read by an image processing apparatus installed with an unspecified number of image editing applications. In this case, it is conceivable that the specific image editing application encrypts the second trimming information with an encryption key and embeds the encrypted second trimming information in an image file.

The object of the invention is also achieved by a storage medium storing the program code of software for realizing the functions of the foregoing embodiments. That is, the present invention is achieved by supplying this storage medium to a system or an apparatus, and reading and executing the program code stored on the storage medium with a computer (or CPU, MPU, etc.) of the system or apparatus.

In this case, the actual program code read from the storage medium realizes the functions of the foregoing embodiments, and this program code and the storage medium storing the program code constitutes the invention.

Examples of storage media that can be used for supplying the program code include floppy (registered trademark) disk, hard disk, magneto-optical disk, optical disks such as CD-ROM, CD-R, CD-RW, DVD-ROM, DVD-RAM, DVD-RW and DVD+RW, magnetic tape, nonvolatile memory card, and ROM. Alternatively, the program code may be downloaded via a network.

The invention is not limited only to the functions of the foregoing embodiments being realized by a computer executing the read program code. For example, the invention also covers the case where an operating system running on a computer performs part or all of the actual processing based on instructions in the program code, and the functions of the foregoing embodiments are realized by this processing.

Further, the invention also covers the case where the program read from the storage medium is written to a memory provided in a function expansion board inserted into a computer or a function expansion unit connected to a computer. In this case, after the program code has been written to the memory, a CPU or the like provided in the function expansion board or the function expansion unit performs part or all of the actual processing based on instructions in the program code, and the functions of the foregoing embodiments are realized by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-041300, filed Feb. 21, 2007, which is hereby incorporated by reference herein in its entirety.

The invention claimed is:

1. An image processing apparatus comprising:
an acquisition unit configured to acquire an image file in which first information related to a first trimming area has been embedded by an image sensing apparatus;
a display control unit configured to cause the acquired image file to be displayed on a display device;
a setting unit configured to set second information related to a second trimming area for the displayed image file, wherein the second trimming area is independent of the first trimming area; and
an editing unit configured to edit the second information related to the second trimming area;
wherein the display control unit superimposes on the display image file the first trimming area and the second trimming area simultaneously and displays the second trimming area related to the second information edited by said editing unit in a different form from the first trimming area related to the first information which is not edited by said editing unit.

2. The image processing apparatus according to claim 1, further comprising an embedding unit configured to embed the second information in a different recording area of the image file from where the first information is embedded.

3. The image processing apparatus according to claim 1, further comprising:
a selection unit configured to select one of the first trimming area and the second trimming area;
a search unit configured to search the image file in which the information of the selected trimming area is embedded,
wherein the display control unit causes to display the searched image file in such a manner that outside of the selected trimming area is trimmed off from the searched image file.

4. The image processing apparatus according to claim 1, wherein the display control unit displays a mark indicating that the first trimming area is set for the image file in proximity to the image file.

5. The image processing apparatus according to claim 1, further comprising a canceling unit configured to cancel the first or the second trimming area set for the image file when saving or printing the image file.

6. The image processing apparatus according to claim 1, further comprising:
a detection unit configured to detect an operation mode currently being executed;
a selection unit configured to select one of the first trimming area and the second trimming area corresponding to a type of the detected operation mode; and
an output unit configured to output the image file in which the selected trimming area is applied.

7. The image processing apparatus according to claim 1, wherein the type of the operation mode is an output method of the image file.

8. An image processing system comprising an image sensing apparatus that records an image file by sensing an object, and an image processing apparatus that acquires the image file from the image sensing apparatus,
wherein the image sensing apparatus includes:
a first setting unit configured to set first information related to a first trimming area for an image file; and
a recording unit configured to record the first information in a first recording area of the image file, and
the image processing apparatus includes:
an acquisition unit configured to acquire the image file in which information on the first trimming area is recorded;

a setting unit configured to set second information related to a second trimming area for the acquired image file, wherein the second trimming area is independent of the first trimming area;

an editing unit configured to edit the second information related to the second trimming area; and a display control unit configured to superimpose on the display image file the first trimming area and the second trimming area simultaneously and displays the second trimming area related to the second information edited by said editing unit in a different form from the first trimming area related to the first information which is not edited by said editing unit.

9. A control method of an image processing apparatus, comprising the steps of:

acquiring an image file in which first information related to a first trimming area has been embedded by an image sensing apparatus;

causing the acquired image file to be displayed on a display unit;

setting second information related to a second trimming area for the displayed image file, wherein the second trimming area is independent of the first trimming area; and editing the second information related to the second trimming area;

wherein the first trimming area and the second trimming area are superimposed on the display image file simultaneously and displayed the second trimming area related to the second information edited by said editing unit in a different form to the first trimming area related to the first information which is not edited by said editing unit.

10. A recording medium having computer-readably recorded thereon a computer program for causing a computer to execute the steps of:

acquiring an image file in which first information related to a first trimming area has been embedded by an image sensing apparatus;

causing the acquired image file to be displayed on a display unit;

setting second information related to a second trimming area for the displayed image file, wherein the second trimming area is independent of the first trimming area and editing the second information related to the second trimming area;

wherein the first trimming area and the second trimming area are superimposed on the display image file simultaneously and displayed the second trimming area related to the second information edited by said editing unit in a different form to the first trimming area related to the first information which is not edited by said editing unit.

* * * * *